Nov. 3, 1931.   G. P. ZEPKE   1,830,308
EXTENSIBLE SUPPORT FOR FIXTURES
Filed Feb. 29, 1928
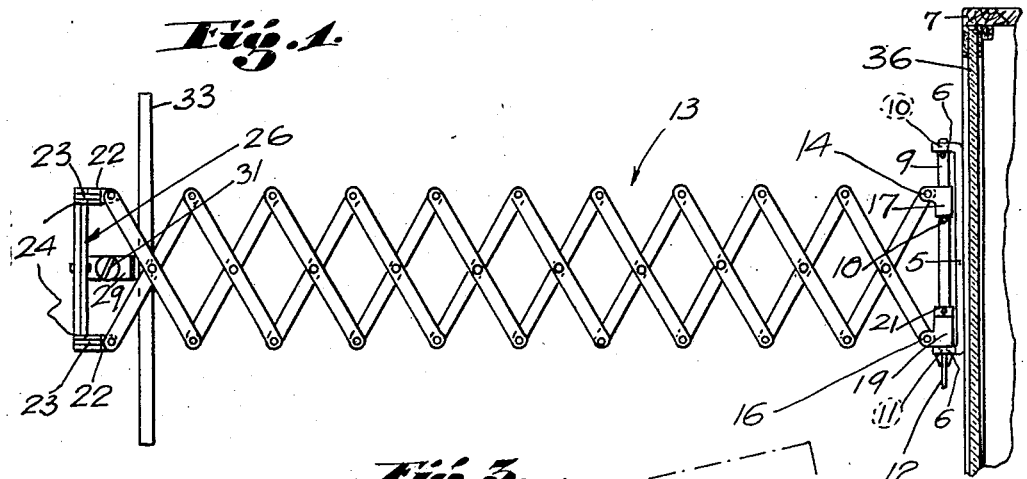
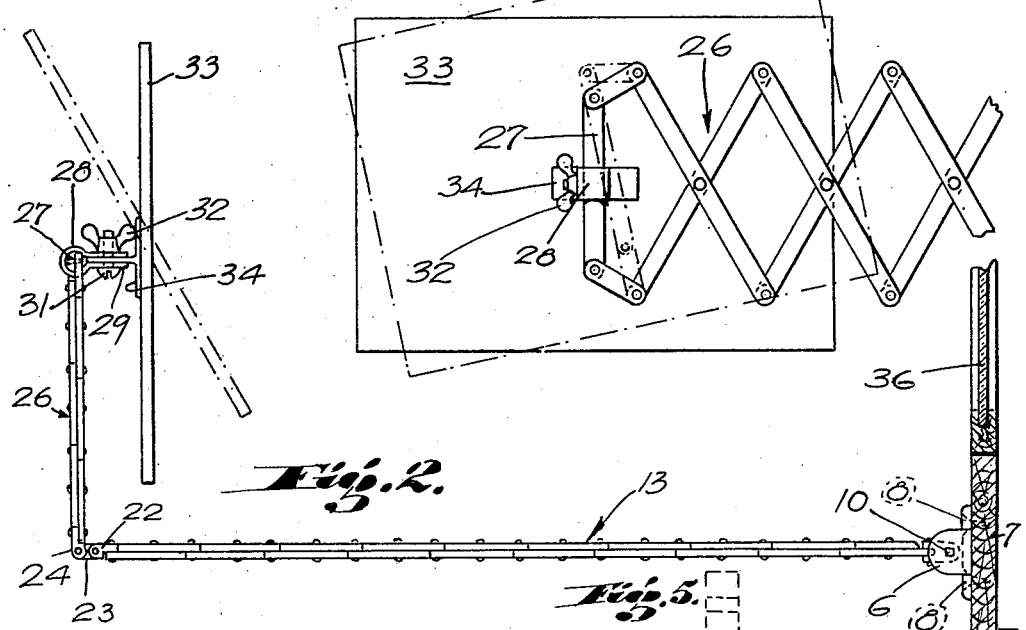
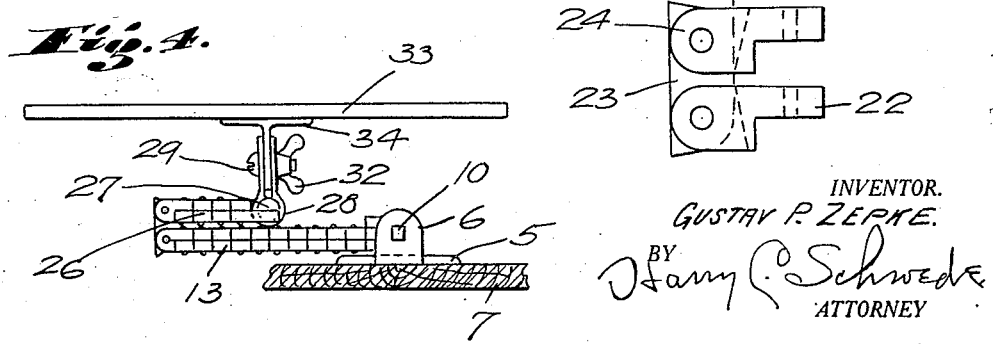
INVENTOR.
GUSTAV P. ZEPKE.
BY Harry C. Schwede
ATTORNEY Patented Nov. 3, 1931

1,830,308

UNITED STATES PATENT OFFICE

GUSTAV P. ZEPKE, OF OAKLAND, CALIFORNIA

EXTENSIBLE SUPPORT FOR FIXTURES

Application filed February 29, 1928. Serial No. 257,944.

The invention forming the subject matter of this application relates to extensible supports for fixtures.

The primary object of the invention is the provision of a support for fixtures, which is extensible and flexible, so that the object supported thereon may be disposed in any convenient position; for instance, such as the positioning of a mirror behind the head so that the back of the head is reflected in the wall mirror.

Another object of the invention is to provide an extensible support for fixtures which may be readily folded and collapsed into a position in which the support is almost entirely concealed behind the fixture supported thereby.

A further object of the invention is the provision of a support which may be readily attached to a wall and in which clamping means are provided for supporting a fixture in such a manner that the fixture may be readily detached from the support and replaced by another kind of fixture.

Another object of this invention is to provide an extensible support for fixtures which is highly useful and simple in construction. Convenience of arrangement, lightness, and comparative inexpense of manufacture are further objects which have been borne in mind in the production and development of this invention.

Although I have shown and described a preferred embodiment of my invention, it is to be understood that changes within the domain of mere form or construction or arrangement may be made by persons skilled in the art, without involving any change in the mode of operation or of function or of result as described in the appended claims.

The invention is clearly illustrated in the accompanying drawings, in which—

Figure 1 shows the support in an extended position, supporting a mirror opposite to a wall mirror, the support being secured to the wall;

Figure 2 is a plan view of the support in the position as shown in Figure 1;

Figure 3 is an enlarged rear view of the mirror on the support so as to show the rear view of the clamp securing the mirror to the support;

Figure 4 is a plan view of my support showing the same in a collapsed or folded position; and Figure 5 is a detailed view of the hinged connection of two sections of the support.

Referring to the accompanying drawings wherein similar reference characters designate similar parts thruout, the various figures described above adequately illustrate my invention, and the following detailed description is commensurate with the above mentioned drawings in enabling an artisan to construct and assemble the constituent parts of the same.

In carrying out my invention, I make use of a bracket 5 having ears 6 extending from the opposite ends thereof and being fixedly secured to a wall 7 by means of screws 8. A rod 9 is inserted into oppositely disposed holes 10 and 11 in the ears 6, the hole 10 being square so as to receive the corresponding square end of the rod 9, thereby preventing the rotation of the rod. The end of the rod 9 extending thru the hole 11 is threaded so as to receive a wing nut 12 thereon, for the purpose to be hereinafter described.

A system of jointed bars 13, commonly known as lazytongs, is supported on the rod 9, the bars being pivoted to each other at the adjacent ends and at the respective centers thereof. The extension of the lazytongs 13 turns the bars around the center and the end pivots thereof, thereby changing the angular position of the bars in the customary manner. During the extension of the lazytongs 13, an end 14 thereof is moved toward an end 16. A sleeve 17 is pivotally secured to the end 14 and is slidable on the rod 9, and the sliding thereof in the direction of the threaded end of the rod 9 is limited by a pin 18 in said rod. A fixed sleeve 19 is held in place between the ear 6 of the bracket 5 and a fixed collar 21 on the rod 9. The sleeve 19 is normally rotatable on the rod 9, but when it is desired to prevent the lazytongs from being turned on the rod 9, the sleeve 19 may be fixed in position by the tightening of the wing nut 12 so as to draw the collar 21 against the sleeve 19, thereby pressing the same against the ear 6, thus rendering the turning of the extension more difficult.

At the free end of the lazytongs 13 are hinges 22 in which are pivotally supported links 23 and upon the other end of the links 23 is supported another set of hinges 24. Shorter lazytongs 26 are secured on the second set of hinges 24. At the free end of the shorter lazytongs 26 is secured a vertically disposed bar 27, upon which is a clamp 28 having lugs 29 extending therefrom, which are provided with holes so as to receive a screw 31 therethru. The lugs 29 are pressed toward each other by means of a wing nut 32 threadedly secured upon the screw 31.

A mirror 33 has a T-shaped plate 34 secured thereto, so that the stem of the plate 34 extends between the lugs 29, said stem being provided with a hole, thru which the screw 31 extends so that when the wing nut 32 is tightened on the screw 31, the lugs 29 are pressed against the stem of the T-shaped plate 34, thereby securing the mirror 33 in place.

It is evident that instead of the mirror, an electric globe or any other fixture may be supported; and the bar 27 and the clamp 28 function similarly to a universal joint, permitting the adjustment of the fixture, which in the present case is the mirror 33, in both vertical and horizontal directions, thereby allowing the same to be adjusted into any angular position required.

It is very advantageous to use the mirror 33 in a bath room in a position where the bracket 5 is secured to the wall 7 at one side of a wall mirror 36. In this case, by pulling the free end of the lazytongs 13, the sleeve 17 will slide downwardly until it abuts against the pin 18. Then by turning the shorter lazytongs 26 and the hinged links 23 in a position at right angles to the lazytongs 13, the mirror may be readily brought into the position shown in Figure 2 so that a person is allowed to comfortably see the back of his head for combing, shaving the neck, or for any other similar purpose. When the mirror 33 is not in use, then the clamp 28 and the mirror are turned 180 degrees around the bar 27. The lazytongs 26 are then contracted and turned with the links 23 in the position shown in Figure 4 so that after contracting the lazytongs 13, the whole extensible support may be completely concealed behind the mirror 33. In this position, the mirror 33 is used as an additional wall mirror. The clamp 28 may be completely removed and a more substantial clamp substituted therefor so as to support any other household fixture.

The operation of the device involves the pulling out of the mirror 33 away from the wall 7, thereby extending the lazytongs 13. Then, by pivoting around the links 23, the shorter lazytongs 26 may be brought in any angular position and extended to the desired distance where the mirror is turned around in both vertical and horizontal directions until it is disposed in the proper angular position.

It will be recognized that a particularly simple extensible support is provided which may be readily used for holding fixtures. The support combines ready adjustability and convenience of attachment to the wall with a ruggedness of construction and positiveness of operation especially adapting it for its use.

Having thus described my invention, what I now claim as novel and desire to secure by Letters Patent is:

1. An extensible support for fixtures, comprising a wall mounting bracket vertically disposed and provided with horizontally extending ears, a non-circular aperture in the upper ear, a circular aperture in the lower ear, a pivot bar slidable in said apertures, a movement limiting pin in said bar, a collar disposed below said pin and fixedly related to said bar, a pair of sleeves rotatable on said bar, and disposed one above said pin and the other between said collar and said lower ear, a threaded extension on said bar below said ear, a hand operated nut on said extension for clamping said sleeve between said collar and lower ear, lazy tongs transversely pivoted relative to said bar in said sleeves, said lazy tongs being hingedly related intermediate its length in a vertical plane, and clamping means for retention of an object at the end thereof.

2. An extensible support for fixtures, comprising a wall mounting bracket vertically disposed, with horizontally projecting ears disposed respectively at the upper and lower ends of said bracket and integral therewith, a non-circular aperture in the upper ear, a circular aperture in the lower ear, a pivot rod with a non-circular end slidable in said upper ear, the opposite end being threaded and extending below said lower ear, a wing or thumb nut on said threaded portion, a pair of rotatable sleeves on said bar, lazy tongs transversely pivoted to said sleeves, a movement limiting pin in said bar for the upper sleeve, said lower sleeve resting on said lower ear, a collar superposed on said lower sleeve and fixed to said bar, said lazy tongs comprising two sections hingedly related in a vertical plane, the end of said lazy tongs completing with a pair of pivotally related links, the opposite ends of said links being pivotally related to a vertical bar, and a clamping device on said bar.

In testimony whereof I affix my signature.

GUSTAV P. ZEPKE.